Figure 2:
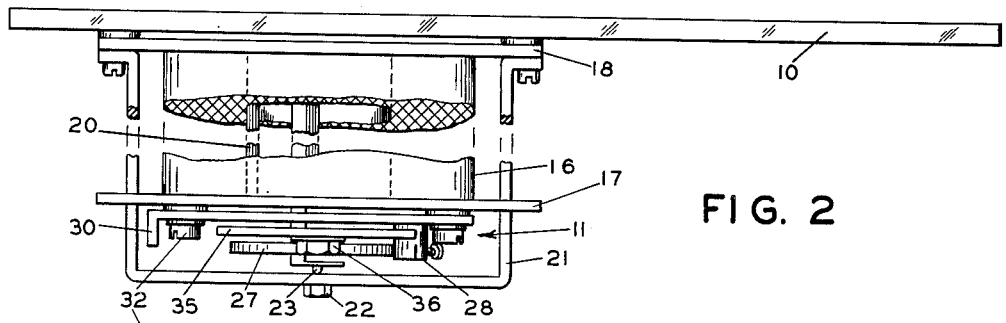

Feb. 17, 1953

J. I. HALL 2,628,993

COMPENSATED CALIBRATING MEANS FOR ELECTRICAL INSTRUMENTS

Filed Dec. 20, 1948

INVENTOR.
BY John I. Hall
George Lynn De Mott
Attorney

Patented Feb. 17, 1953

2,628,993

UNITED STATES PATENT OFFICE 2,628,993

COMPENSATED CALIBRATING MEANS FOR ELECTRICAL INSTRUMENTS

John I. Hall, Waterbury, Conn., assignor to The Bristol Company, Waterbury, Conn., a corporation of Connecticut Application December 20, 1948, Serial No. 66,198

2 Claims. (Cl. 171—95)

This invention relates to electrical measuring instruments of the repulsion type, and more particularly to the calibration of such instruments.

Instruments of the type under consideration consist essentially of a fixed coil having a fixed mass of ferromagnetic mounted therein, and a cooperating movable mass of ferromagnetic material pivotally mounted for movement within the compass of said coil. The movable mass is biased to a position juxtaposed with respect to the fixed mass and is capable of being deflected with respect to the fixed mass when current is supplied to the coil. The amount of the deflection is determined by the intensity of the current supplied to the coil, and the strength of the biasing means whether it be a spring or gravity actuated means. According to well known magnetic principles the current flowing in the coil induces a field in both the masses to bring about the repulsion, which is opposed by the biasing means. The movable mass is arranged to actuate an indicating means which is most commonly a pointer associated with a fixed scale, or a stylus and a movable chart.

The force of the repulsion between the fixed and movable masses varies as the intensity of magnetization of the respective masses and since both are magnetized from the same current, their mutual reaction will tend to vary as the square of the current flowing in the coil. This law is subject to a number of modifying influences, such as the non-linear characteristic of ferromagnetic materials, and changes in the geometry of the magnetic circuit as the moving element is displaced. While the changes in these influences tend to offset one another to a degree, the ultimate scale is relatively unpredictable and difficult to reproduce. Attempts to compensate for irregularities in scale conformation have resulted in some improvement. It has generally been found, however, that the compensation agrees with a predrawn scale only at a few specific points, and the remainder of the scale is merely an approximation.

The main object of the present invention is to provide a simple, rugged and unitary means capable of ready adjustment to vary both scale length and distribution to bring the readings into agreement with predetermined graduations on a printed scale.

Another object is to provide a means which can be adapted to modern quantity production manufacture, and can be manipulated without the use of expensive and complicated calibrating and assembly apparatus.

Figure 1:
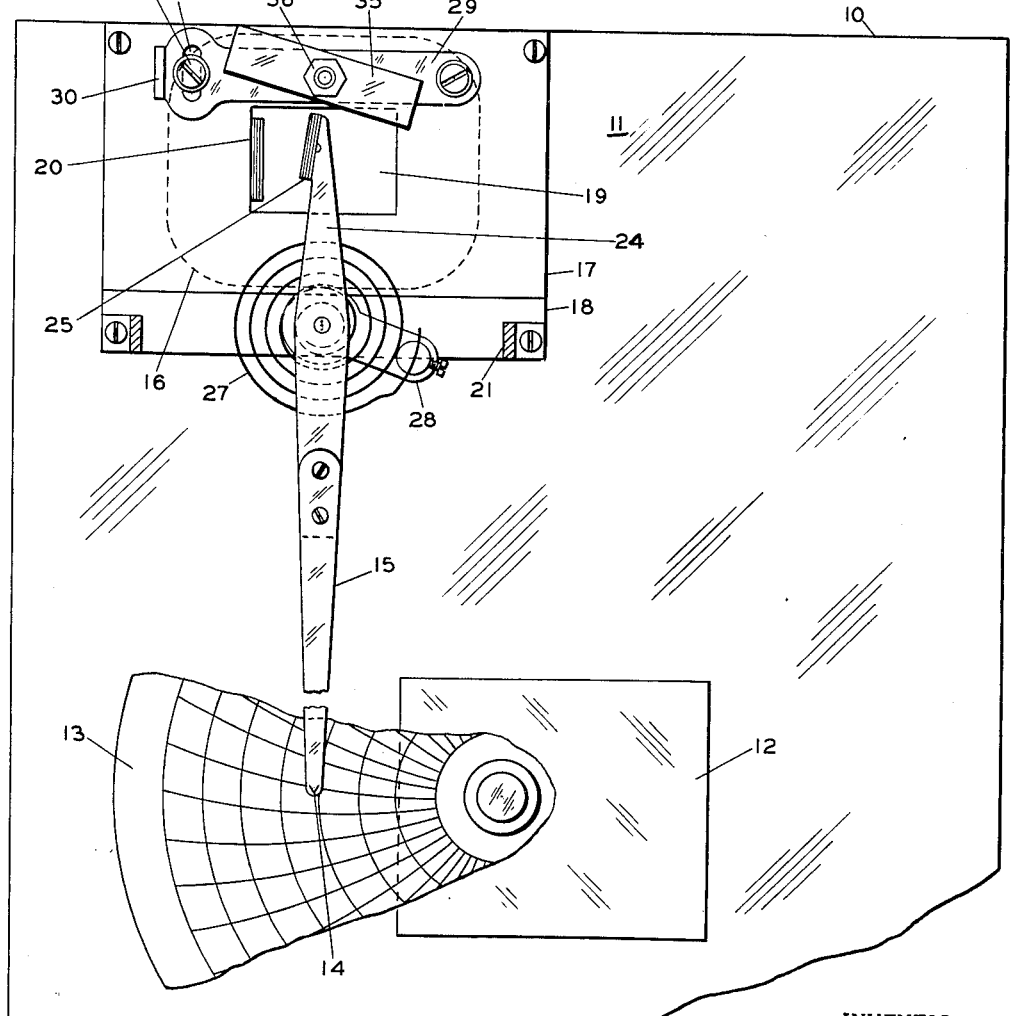

Other objects and advantages will appear from the following specification when it is read in conjunction with the accompanying drawings in which:

Figure 1 is a front view of one form of recording instrument embodying the invention; and Figure 2 is a top view of the instrument shown in Fig. 1.

In the drawings, numeral 10 designates a base plate having mounted upon it an electric measuring element designated generally by the reference character 11, and a recording mechanism comprising a clock member 12 adapted to drive at a constant speed a circular chart member 13, the surface of which is engaged by a pen or stylus 14 carried upon the extremity of a deflectable arm 15 forming a part of the measuring element. The chart 13 is of the type whereon a graduated scale, having a suitably selected and preferably uniform proportionality between the graduations. It is printed, lithographed or otherwise marked by methods adapted to quantity production of such charts. It will be apparent that, with the scale proportionality pre-established in the manufacture of the chart, any departure of the measuring element from strict agreement with the graduations of the chart can only be corrected by calibrating the scale individually for each instrument. Such a procedure is obviously unsuited to quantity production. The present invention is specifically directed to adjusting means whereby measuring elements manufactured on a quantity production basis may be brought to a common standard of calibration, and caused to conform with acceptable accuracy to the scale of the chart at all points throughout its range.

The measuring element which, as hereinbefore stated, is of the repulsion type, comprises a coil 16 of insulated wire adapted to receive the current under measurement, and a front plate 17 and a back plate 18 adapted to support said coil and also to carry the working parts of the instrument. As here shown the coil 16 is of rectangular cross section and contains a rectangular opening 19. Mounted within this opening and at one side thereof, with its principal axis disposed substantially parallel to that of the opening 19, is an extended stationary core or magnetizable mass 20 formed of laminations of ferromagnetic material. A bridge piece 21 suitably formed and secured, for example, to the back plate 18, provides a support for a front pivot bearing 22 adapted to cooperate with a similar pivot bearing located in said back plate and not shown in the drawing. These bearings pivotally support a shaft or spindle 23, providing an axis substantially parallel to that of the opening and passing immediately beneath the coil 16.

Secured to the spindle 23 is an arm 24 carrying a bracket portion which passes into the opening 19 and bears a magnetizable movable mass or vane 25, made up of laminations of ferromagnetic material similar to those of the stationary mass 20. The arm 24 is extended also in a direction radially away from coil 16 and has an arm 15 which carries the pen or stylus 14. Secured also to the spindle 23 or to the arm 24 is a spiral biasing spring 27, having a fixed end attached to an abutment 28 carried by the plate 17 and adjustable about the axis of the spindle 23. The strength of the spring 27 with respect to the mechanism and the electrical characteristics of the assembly, are made such that a change in the measured electrical quantity corresponding to the full range of the instrument will cause the pen to traverse substantially the full scale of the chart, the latter being graduated with its divisions space either uniformly, or according to a law experimentally determined as representing the average characteristics of the instrument.

The means for bringing the calibration of an individual instrument into agreement with the printed scale of the chart according to the present invention will now be described. Pivotally mounted on the plate 17 and passing near the upper edge of the rectangular opening 19 is a lever arm 29 adapted for limited angular adjustment in a plane perpendicular to the axis of the coil. The lever arm 29 is provided with an outwardly projecting adjusting finger 30. This finger may be moved to adjust the arm 29, and its displacement is limited by an arcuate slot 31 through which passes a clamping screw 32 threaded into the plate 17 and adapted to be tightened to secure the arm 29 in any desired position within its range of angular displacement. Pivotally mounted on the arm 29 is a magnetizable plate 35 formed of ferromagnetic material. This element is rotatable through a limited angle about an axis which passes near the central plane of opening 19 and it lies within the fringe of the magnetic field linked with the coil 16. Plate 35 is rotatably adjustable about its axis and may be held in adjusted position by a friction nut 36.

The plate 35 has the effect, when it is positioned in the field of coil 16, of concentrating a portion of the flux in such a way that its distribution pattern will materially affect the force which is exerted upon the movable armature 25 as its position is varied. The principal force which tends to deflect the moving element against the influence of spring 27 is that due to mutual repulsion between the magnetic members 20 and 25, but the fringe effect due to the presence of the plate 35 in the vicinity of armature 25 appears in the form of an attraction force which varies with the distance between the armature and the portions of the adjustable plate to which it is most closely adjacent. When the plate 35 occupies a position in which its right extremity is closer to the axis of opening 19 than its left extremity, in other words, when the plate 35 occupies the position shown in Fig. 1, the concentration of magnetic flux between the armature and the plate will increase as the armature is displaced toward the right, and this represents a deflection away from the zero end of the scale. Thus the overall effect of placing the plate 35 in the position indicated in the drawing is to raise the upper part of the scale of the instrument and thus to render the sensitivity of the instrument proportionally greater in the upper part of its range. In similar manner the effect of rotating the plate 35 in a counterclockwise direction from the position indicated, that is, by raising its right hand end and lowering its left hand end will be to "crowd" the divisions in the upper portion of the range of the instrument, and correspondingly "expand" the divisions toward the lower portion of the range. Raising and lowering the plate 35 together with arm 29 by loosening the screw 32 and shifting the arm 29 about its pivot point through finger 30, will tend to affect the intensity of the overall influence of plate 35 upon the instrument calibration. Hence, if arm 29 is lowered so that plate 35 approaches the armature 25 more closely, the attractive influence of the plate on said armature will be increased with a corresponding increase in its effect on the instrument scale. Adjustment of the arm 29 upwardly, on the other hand, will render the plate 35 less effective and, therefore, exert less effect on the normal repulsive effect between magnetic members 20 and 25.

In utilizing the structure so far described to calibrate an instrument it has been found expedient to follow a sequence of steps which tends to simplify the adjustments and to carry them out in an orderly manner. It will be understood that in the original construction of the instrument the parts will be so proportioned that there is a rough proportionality between the parts of the assembled instrument and the ideal proportionality as it is printed on the instrument chart. It remains, therefore, only to perform more or less minor adjustments in order to make these proportionalities more precise, that is, to make the response of the instrument conform to the graduations on the chart throughout the range of the instrument.

If the instrument is to be used with a scale having its zero agreeing with the zero value of the quantity to be measured, the setting of the pen will be carried out when zero current is flowing in the coil 16. If, however, the instrument is of the suppressed zero class in which the pen deflections are obtained through only a limited range of variations in the quantity to be measured, the pen setting corresponding to the lowest point of its range will be carried out with a current or voltage of a value corresponding to the lowest point in that range applied to the circuit of the instrument.

When an instrument having a construction embodying the rough proportionality indicated above is to be calibrated, it is connected in a suitable circuit with a standard instrument by which it is to be calibrated. The bottom point of the scale is first established through a zero adjustment, and this is accomplished by modifying the angular setting of abutment 28 until the pen 14 rests upon the bottom graduation of the scale agreeing with the position of the indicator of the standard instrument. The current or voltage flowing through the standard instrument and the calibrating circuit is next increased to a value which corresponds to the upper limit of the range of the instrument being calibrated. If the test instrument reads lower than the upper limit of the scale, this discrepancy is reduced and eliminated by rotating the magnetic plate 35 about its axis and lowering its right hand end until the pen is brought into registry with the upper graduation on the scale. If the instrument being tested is of the suppressed-zero type the adjustment just performed may disturb the calibration at the bottom of the scale. Any such disturbance can be corrected by adjustment of the abutment 28, and then the calibration at the top of the scale repeated. These steps are carried out alternately, that is, by successively and alternately adjusting the abutment 28 and the plate 35 until the instrument being tested reads correctly both at the top and the bottom points of the scale.

With the adjustments performed as above indicated, the scale limits are established and it remains only to check an intermediate point near the middle of this range in order to secure accuracy, within the limits of the instrument, over its entire range. If the intermediate point is found to be correct after the scale limits have been established, the instrument under test should be in calibration throughout its range. If, however, the test instrument reads lower than the standard, at the intermediate point, this error may be eliminated by loosening clamping screw 32 and moving the arm 29 together with plate 35 downwardly to reduce the clearance between the plate 35 and armature 25. This adjustment will tend to raise the calibration at the intermediate point of the scale and will, of course, require re-checking the calibration at the two end points of the scale, as described above. If the test instrument should read higher at the intermediate point of the scale the error is eliminated by elevating the arm 29 and the parts carried thereby and, of course, re-checking the end points of the scale. The sequence of adjustments described can be repeated until the readings of the test instrument correspond to those of the standard instrument, both at the center of the scale and at the two limits. Thus, by simple mechanical adjustment it becomes possible to perform a calibration which heretofore has required time consuming operations and has rendered it difficult and expensive to obtain satisfactory agreement between the readings of a mass production instrument having a printed scale, and those of standard instruments employed for calibration purposes.

It will thus be seen that the invention above described provides a simple adjustment with great flexibility. The arm 29 provides means for giving movement of translation to the plate 35 while the pivotal mounting of this plate provides for rotation independently of movement of the plate. Thus it is possible to easily and accurately control the flux distribution of the magnetic field by use of simple, reliable structure. It provides for the first time in the art, adjustment of a repulsion type of instrument which makes it practical to utilize a printed scale with the assurance that the response of the instrument will conform to the scale graduations with acceptable accuracy, and with a minimum of difficulty and time consumption.

Although only one form of measuring instrument has been described, it will be obvious that changes may be made in the details of construction and operation within the scope of the appended claims without departing from the spirit and scope of the invention.

What is claimed is:

1. An electrical measuring instrument of the repulsion type comprising a coil adapted to carry current whose magnitude is to be determined and having therein a central opening, a stationary plate of magnetic material occupying a relatively small part of the central opening, a movable member adapted for rotation about an axis located exterior to the coil parallel to the axis of said central opening and having an armature of magnetic material located substantially within said central opening, said armature being adapted to move within the coil with respect to said stationary plate under the influence of magnetic reaction between said plate and said armature, a non-magnetic arm pivotally mounted for rotation about an axis located exterior to said central opening and parallel to the axis of said central opening, said arm being located adjacent one edge of said central opening, and a plate of magnetic material located adjacent said arm in substantially parallel relation thereto, said last-named plate being pivotally connected to said arm for rotation about an axis which is located substantially midway of the length of said plate and which is disposed substantially midway of the width of said central opening whereby one end of said pivotally mounted plate may be advanced toward said central opening as the other end recedes from the opening and vice versa.

2. An electrical measuring instrument of the repulsion type comprising a coil adapted to carry current whose magnitude is to be determined and having therein a central opening, a stationary plate of magnetic material occupying a relatively small part of the central opening, a movable member adapted for rotation about an axis located exterior to the coil parallel to the axis of said central opening and having an armature of magnetic material located substantially within said central opening, said armature being adapted to move within the coil with respect to said stationary plate under the influence of magnetic reaction between said plate and said armature, means biasing said armature toward said stationary plate, a non-magnetic arm pivotally mounted for rotation about an axis located exterior to said central opening and parallel to the axis of said central opening, said arm being located adjacent one edge of said central opening, means to maintain said arm in fixed position with respect to said one edge of said central opening, and a plate of magnetic material located adjacent said arm in substantially parallel relation thereto, said last-named plate being pivotally connected to said arm for rotation about an axis which is located substantially midway of the length of said plate and which is disposed substantially midway of the width of said central opening whereby one end of said pivotally mounted plate may be advanced toward said central opening as the other end recedes from the opening and vice versa.

JOHN I. HALL.

REFERENCES CITED

The following references are of record in the file of this patent:

UNITED STATES PATENTS

| Number | Name | Date |
|---|---|---|
| 706,982 | Menges | Aug. 12, 1902 |
| 1,452,590 | Brogger | Apr. 24, 1923 |
| 1,490,167 | Fallon | Apr. 15, 1924 |
| 1,812,371 | Pudelks | June 30, 1931 |
| 1,987,177 | Borden | Jan. 8, 1935 |

FOREIGN PATENTS

| Number | Country | Date |
|---|---|---|
| 507,168 | France | June 14, 1920 |
| 250,380 | Great Britain | June 1, 1931 |